United States Patent Office 3,006,385
Patented Oct. 31, 1961

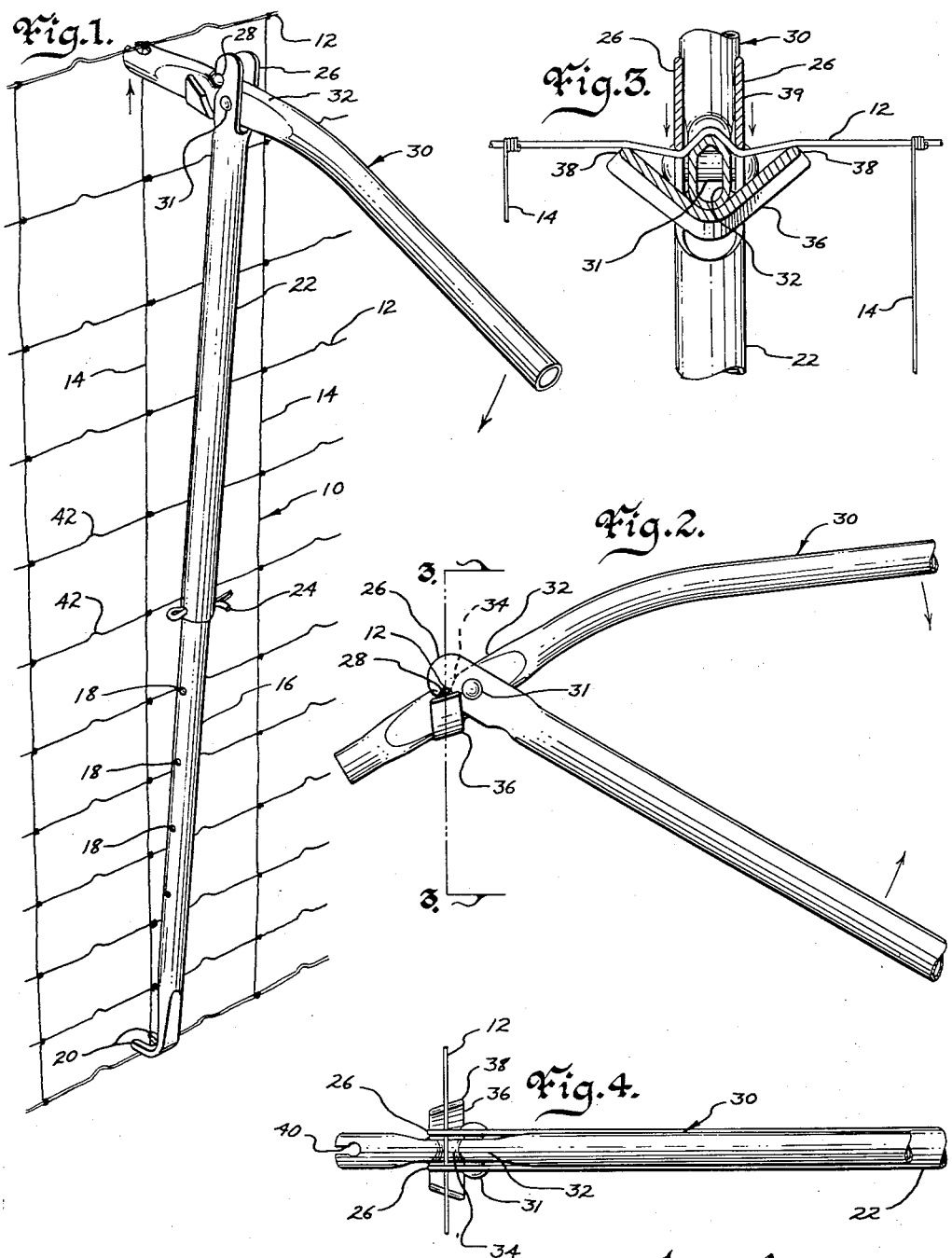

3,006,385
MEANS FOR TIGHTENING A WOVEN
WIRE FENCE
George P. Whitmore, Box 63, Madrid, Iowa
Filed Sept. 15, 1958, Ser. No. 761,021
2 Claims. (Cl. 140—106)

My invention relates to fences and more particularly, to a method and means for tightening a woven wire fence.

Fence building and repairing consumes a great amount of time for most farmers and ranchers. The woven wire fence often loses its tension and upright position when weather causes the fence posts to move or animals lean or rub against the wire. The ordinary method of tightening such a fence is to release the wire from all of the fence posts and then pulling the wire tight with a conventional fence tightener. This is a very laborious job and is particularly complicated by the removal of staples and the like from fence posts to free the woven wire.

Therefore, the principal object of my invention is to provide a method and means for tightening a woven wire fence without removing the wire from the fence posts.

A further object of my invention is to provide a means for tightening a woven wire fence of different heights.

A still further object of my invention is to provide a means for tightening a woven wire fence that will substantially permanently hold the fence in a tightened condition.

A still further object of my invention is to provide a means for tightening a woven wire fence that is economical of manufacture, durable in use and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

FIG. 1 is a perspective view of my device in one stage of the tightening operation;

FIG. 2 is a side elevational view of my device in another stage of the tightening operation;

FIG. 3 is a sectional view of my device taken on line 3—3 of FIG. 2; and

FIG. 4 is a top view of my device while in the operation shown in FIG. 2.

The numeral 10 generally designates a woven wire fence with horizontal line wires 12 and vertical stay wires 14. The numeral 16 designates the base rod of my device which has a plurality of horizontal holes 18. Spaced apart toe elements 20 extend at right angles from the lower end of rod 16.

The upper end of rod 16 is telescopically inserted into the lower end of hollow rod 22. A cotter key 24 can be selectively inserted through an appropriate horizontal hole in the lower end of rod 22 to pass through one of the holes 18 in rod 16 so that the rods 16 and 22 can be effectively connected.

The upper end of rod 22 terminates in two parallel spaced apart ears 26. The forward edges of ears 26 present a hook-shaped arcuate portion 28. A handle member 30 is pivoted by pin 31 near one of its ends between ears 26 at a point slightly below arcuate portions 28. The handle 30 has a flattened, narrow portion 32 that passes between ears 26. As viewed from the side (see FIG. 2), a V-shaped notch 34 appears in the top of portion 32 just forwardly of pin 31. As shown in FIG. 3, the bottom of notch 34 tapers downwardly and outwardly to form an inverted V-shape. At a point underneath portion 32 and slightly forward of pin 31 is V-shaped bracket 36 which has upwardly and rearwardly extending end portions 38 which terminate substantially on a line with the apex 39 of the notch 34. This structure is clearly shown in FIG. 3. Handle 30 terminates into a vertical keyhole notch 40 at a point shortly in front of pin 31 and the elongated gripping portion of the handle extends downwardly from the pin.

I will first describe my method of tightening a woven wire fence. Rather than detach the slackened fence wire from its supporting posts, I first impose crimped indentations into the line wires. The numerals 42 illustrate these crimped indentations in the line wires, as shown in FIG. 1. It is not necessary to crimp all of the line wires, but the effect of this crimping action will shorten the overall length of the line wire and will pull it tight between two supporting fence posts. Thus, the fence wire never needs to be detached from the fence post.

It is important to have a sharp indentation in the line wires so that the fence cannot be easily stretched. Thus, I have found that it is best to support the line wires immediately adjacent the point of crimping while the crimping is being done, or else the imposed crimp will be flat rather than abrupt. A flat indentation can be easily stretched.

The stay wires 14 often become bent while the fence is slack and it is necessary to stretch these wires also. The best way to accomplish this is to hold the bottom line wire against the ground and then to pull upwardly on the topmost line wire. It is very difficult to accomplish this manually. Thus, the steps in my wire tightening method are:

(1) The supporting of a line wire at two closely related spaced apart points;

(2) the placing of a crimp indentation in the wire between these two supporting points;

(3) the holding against movement of the lower end of the stay wires; and (4) the exertion of an upward force on these stay wires.

Of course, steps (1) and (2) could be repeated many times before steps (3) and (4) are accomplished.

The normal operation of my device is as follows: A line wire 12 is placed within V-shaped notch 34 when the rod 22 and handle 30 are in the general "open" position shown in FIG. 1. The line wire 12 finds itself supported by the ends 38 of bracket 36 and the wire is also touching the inverted V-shaped apex 39 at the bottom of notch 34 at a point midway between the ends of the bracket. The gripping portion of handle 30 is then moved downwardly with respect to rod 22 to move the arcuate portions 28 on ears 26 past the V-shaped notch 34. The arcuate portions 28 will engage the wire 12 at either side of notch 34 and will tend to force the wire 12 downwardly over the apex of the bottom of the notch. The ends 38 of bracket 36 resist such relative movement of the wire, but the continued closing of ears 26 on notch 34 permits the arcuate portions 28 to force the wire 12 to conform to the cross sectional shape of the inverted V-shaped apex 39 of the bottom of notch 34. The support of the wire 12 by the bracket 36 is critical to the placing of a sharp indentation in the line wires. This operation is repeated several times on a single line wire and these numerous crimped indentations shorten the effective length of the wire and tighten the fence. Obviously, this operation can be effected by moving either the handle 30 and/or the rod 22.

The stay wires 14 are tightened by allowing the toe elements 20 to embrace the stay wire at a point immediately on top of the lowermost line wire 12. This action effectively anchors the lower end of the stay wire. The cotter key 24 can then be placed in any of the holes 18 to adjust the overall height of rods 16 and 22 to the desired height. The keyhole notch 40 then embraces the top end of the stay wire at a point underneath the topmost line wire. This arrangement is shown in FIG. 1. The handle 30 is then depressed downwardly to stretch the stay wire.

Thus, from the foregoing, it is seen that my invention will accomplish at least all of its stated objectives, particularly that of permitting the tightening of a woven wire fence without removing the wire from the fence posts.

Some changes may be made in the construction and arrangement of my method and means for tightening a woven wire fence without departing from the real spirit and purpose of my invention, and it is my intention to cover by my claims, any modified forms of structure or use of mechanical equivalents which may be reasonably included within their scope.

I claim:

1. In a fence tightening tool, a normally vertical rod, two parallel spaced apart ears on the upper end of said rod, a substantially horizontal handle pivotally connected near one of its ends to said rod between said ears, said ears having upper portions normally extending above said handle, an arcuate-shaped indentation at correspondingly similar points on each of the upper portions of said ears, said indentations being capable of receiving a straight segment of wire therein and therebetween, a wire engaging portion on said handle which dwells in a vertical plane directly below the arcuate-shaped indentation in each of said ears; a bracket on said handle having opposite outer ends which extend upwardly and outwardly to terminate in spaced alignment with said wire engaging portion on said handle; said wire engaging portion on said handle and said outer ends on said bracket serving as points of support for a straight wire as said handle is pivoted in one direction to engage the arcuate-shaped indentation on each of said ears with such a straight wire; said ears engaging such a wire only at points adjacent the wire engaging portion on said handle.

2. The structure of claim 1 wherein the wire engaging portion on said handle has a tapered shape so that a V-shaped bend can be imposed in a straight wire when said ears on said rod are closed on a wire supported on said wire engaging portion and the outer ends of said bracket.

References Cited in the file of this patent

UNITED STATES PATENTS

| | | |
|---|---|---|
| 117,860 | Bushnell | Aug. 8, 1871 |
| 500,551 | Barnett | July 1, 1893 |
| 522,164 | Lockwood | June 26, 1894 |
| 762,691 | Corrigan | June 14, 1904 |
| 986,058 | Heitmeyer | Mar. 7, 1911 |
| 1,812,725 | Stanley et al. | June 30, 1931 |
| 1,931,786 | Zimmerman | Oct. 24, 1933 |
| 2,014,062 | Braddock | Sept. 10, 1935 |
| 2,673,579 | Hollmig | Mar. 30, 1954 |
| 2,879,808 | Mallory | Mar. 31, 1959 |

FOREIGN PATENTS

| | | |
|---|---|---|
| 109,669 | Australia | Jan. 24, 1940 |